No. 660,282. Patented Oct. 23, 1900.
F. TRUMP.
WATER WHEEL.
(Application filed Apr. 13, 1900.)
(No Model.)
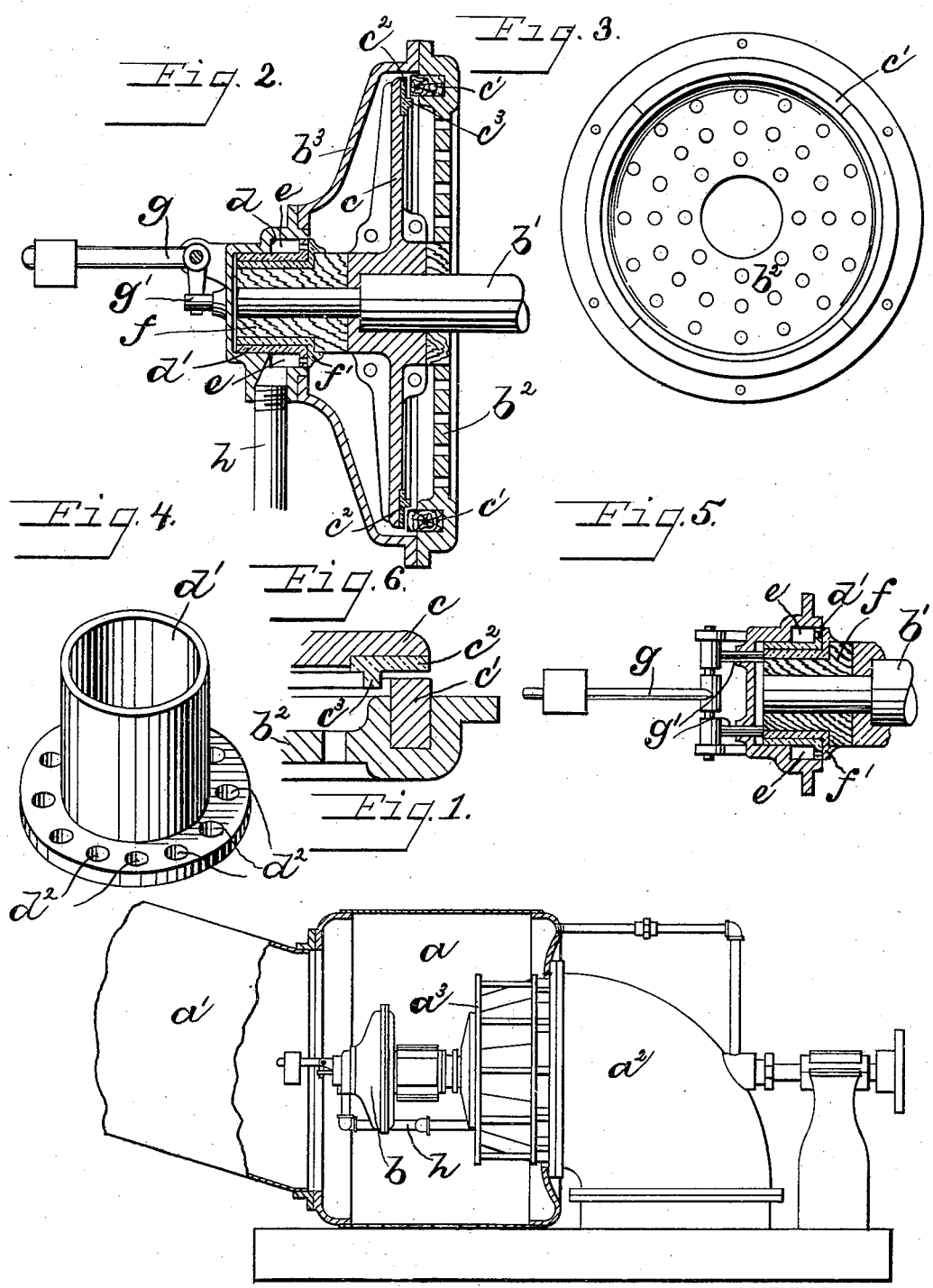

UNITED STATES PATENT OFFICE.

FULLER TRUMP, OF SPRINGFIELD, OHIO.

WATER-WHEEL.

SPECIFICATION forming part of Letters Patent No. 660,282, dated October 23, 1900.

Application filed April 13, 1900. Serial No. 12,685. (No model.)

*To all whom it may concern:*

Be it known that I, FULLER TRUMP, a citizen of the United States, residing at Springfield, in the county of Clark and State of Ohio, having invented certain new and useful Improvements in Water-Wheels, of which the following is a specification.

My invention relates to a device for counterbalancing the end thrust or pressure upon the step or bearings of turbine water-wheels, and especially to a counterbalance which operates automatically by the pressure of the water.

In the ordinary form of turbine water-wheels there is considerable end thrust or pressure in the direction of the flow of the water through the wheel. This end thrust or pressure causes undue friction and wear on the step or in the bearings of the wheel and results in the loss of power. This is especially true in wheels of the single-discharge type, in which the entire force or current of the water tends in one direction; and to overcome or counterbalance this end thrust by water-pressure is the object of my invention, and I attain the same by the constructions and combinations hereinafter described and claimed.

In the annexed drawings, Figure 1 is a general view showing the relation of my balancing device to the water-wheel and necessary accessories. Fig. 2 represents a vertical sectional view of my counterbalancing device. Fig. 3 is a detail plan view of the perforated disk forming the bottom of the housing for diaphragm. Fig. 4 is a detail view of the collar with flange having openings for outlet-valve. Fig. 5 is a detail of the outlet-valve, showing arrangement of weighted lever. Fig. 6 is a detail of the thrust-bearing and inlet-valve.

Like parts are represented by similar letters of reference in the several views.

In the drawings, $a$ represents the penstock; $a'$, the inlet-pipe; $a^2$, the draft-chest.

$a^3$ represents the water-wheel casing, and $b$ is my improved balancing device.

$b'$ is the shaft upon which the water-wheel is mounted.

In constructing my balancing device I employ a chamber formed by a perforated disk $b^2$ and the bell-shaped housing $b^3$, which surrounds the shaft $b'$, as shown in Fig. 1. Inside of this housing, rigidly mounted on shaft $b'$, is a diaphragm $c$, the outer edge of which is adapted to contact at times with a suitable bearing-ring on the perforated disk $b^2$ to receive the pressure from the diaphragm and prevent the water from flowing into the chamber behind said diaphragm, thus practically forming both a bearing to receive the pressure of the diaphragm and an inlet-valve in said chamber. In the drawings I have shown the perforated disk $b^2$ provided with a wooden bearing-ring $c'$ and the diaphragm $c$ provided with a brass seat or bearing $c^2$. The housing $b^3$ is provided with an annular recess $d$, which, together with a flanged collar $d'$, preferably of brass, forms the circular chamber $e$. There is a wooden loose bearing $f$ on the shaft $b'$. This bearing $f$ is surrounded by a flanged collar $f'$, preferably of brass, which is of such size as to have a loose sliding fit with the collar $d'$, the flange of which collar contains a plurality of openings $d^2$, as shown in Fig. 4. The flanged collar $f'$, in conjunction with the flanged collar $d'$, forms an outlet-valve for my balancing device. It is apparent that by making the shoulder on the wooden bearing $f$ of sufficient size to cover the openings in the flange of the collar $d'$ the collar $f'$ may be dispensed with. By means of a weighted bell-lever $g$, acting on the outer ends of a plurality (preferably two) of pins $g'$, passing through the housing $b^3$, the inner end of which pins rest against the ends of the loose bearing $f$ and the flanged collar $f'$, the outlet-valve is given a tendency to remain open. The exhaust or waste pipe $h$ leads from the circular chamber $e$ to the water-wheel casing $a^3$. In operation whatever pressure is being exerted on the water-wheel the water passing through the perforation of the disk $b^2$ will exert a similar pressure on the diaphragm $c$, and the area of the diaphragm being made to correspond with the area of the wheel the pressure will be equal. The chamber behind the diaphragm $c$ being practically empty and the resistance from this direction being slight, the diaphragm will have a tendency to move in a direction away from the wheel, but being rigidly attached to the shaft it will carry the shaft and wheel with it, (a slight play or movement of the parts being provided for.) As the diaphragm moves in this direction it allows the water to enter between the edge of the diaphragm $c$ and the valve-seat $c'$ into the chamber behind the diaphragm $c$. When the pressure in this chamber behind the diaphragm $c$ equals that in the penstock or on the outer side of the diaphragm, said diaphragm, by reason of its being attached to the wheel-shaft and the tendency of the wheel to be carried with the flow of the water, will tend to approach the valve-seat $c'$ and allow the outlet-valve under the action of the weighted bell-lever $g$ to open. Thus the water in the chamber behind the diaphragm $c$ will be allowed to escape into the circular chamber $e$ and through the exhaust or waste pipe $h$ into the water-wheel casing $a^3$. Thus it will readily be seen that an equilibrium will be maintained between the pressure in one direction upon the wheel and in the other direction upon the diaphragm $c$. The orifice of the inlet-valve is to the orifice of the outlet-valve as the pressure against the outer side of the diaphragm is to the pressure in the opposite direction—i. e., as the pressure against the outer side of the diaphragm increases the orifice of the inlet-valve will increase and that of the outlet-valve decrease, and when the chamber is filled and the pressure is in the opposite direction the orifice of the inlet-valve will decrease and that of the outlet-valve increase.

The perforated disk $b^2$ prevents the admission of trash or other obstacles to the diaphragm-chamber, and as a further provision against such obstructions the brass seat $c^2$ is preferably made with a shoulder $c^3$ to conform with the wooden valve-seat $c'$, as shown in Fig. 6.

It is quite obvious that this device may be used with equal success in connection with a vertical wheel as with the horizontal wheel shown in the drawings.

Having thus described my invention, I claim as follows:

1. In a water-wheel balance, the combination with a water-wheel of a diaphragm rigidly connected thereto, but free to move therewith, a housing of which said diaphragm forms one side, an inlet and outlet valve in said housing adapted to be automatically regulated by the pressure of the water on said diaphragm, substantially as specified.

2. In a water-wheel balance, the combination with a water-wheel rigidly mounted upon a shaft, of a diaphragm also rigidly mounted upon said shaft, the combination being free to move slightly in a longitudinal direction, a housing surrounding said diaphragm, a valve-seat in said housing formed in connection with said diaphragm, an inlet-valve, an outlet-valve and an exhaust-pipe communicating therewith, substantially as and for the purpose specified.

3. In a water-wheel balance, a diaphragm rigidly mounted on the water-wheel shaft, said diaphragm forming one side of a water-tight compartment, an inlet and outlet valve in said compartment, the one opening as the other closes, substantially as and for the purpose specified.

4. In a water-wheel balance, the combination with a water-wheel and its shaft of a diaphragm mounted thereon, the said combination being permitted a slight longitudinal movement, a housing provided with a seat or bearing for said diaphragm, the diaphragm forming one side of said housing and in connection with said seat or bearing an inlet-valve to said chamber, a recess in said housing a flanged collar forming therewith an outlet-valve, means by which said valve is operated by the horizontal movement of the shaft, and an exhaust-pipe leading from outlet-valve, substantially as specified.

5. The combination of a water-wheel and a shaft, a diaphragm connected to said shaft, and means including a valve for varying the pressure on the diaphragm by the longitudinal movement of the shaft, substantially as specified.

6. In a penstock, the combination with a water-wheel and its shaft, of a diaphragm mounted rigidly on said shaft, a metal seat or bearing on said diaphragm adjacent to the periphery thereof, a housing for said diaphragm, a chamber in said housing, a perforated disk on the seat side of said diaphragm forming the bottom of said housing, a seat or bearing in said perforated disk to contact with and receive the pressure of the metal seat or bearing of said diaphragm, forming therewith an inlet-valve for the chamber of said housing, an outlet-valve in the chamber of said housing and means for operating the same, substantially as and for the purpose specified.

7. In a penstock, the combination with a water-wheel and its shaft, of a diaphragm rigidly attached to said shaft, a bell-shaped housing for said diaphragm, a chamber in said housing, an inlet-valve formed by said diaphragm and a seat in the bottom of said housing, a loose wooden bearing in said chamber for said shaft, one end of which rests against the inner side of said diaphragm and having a shoulder thereon, a plain metal collar with a flange at its inner end adapted to fit said wooden bearing and rest against the shoulder on same, a metal collar with a perforated flange at its inner end adapted to fit said plain collar and rest against and to be covered by the flange of said plain collar, a recess in the head of said housing forming with said plain and perforated flanged collars an outlet-valve for the chamber of said housing, a weighted lever outside of said housing with pins adapted to extend through the wall of said housing and press against the outer ends of said plain collar and wooden bearing and an exhaust-pipe leading from said outlet-valve into the casing of said water-wheel, substantially as and for the purpose specified.

8. The combination with a water-wheel, a shaft on which said wheel is mounted, a diaphragm connected to said shaft, subject to the water-pressure, a valve to control the pressure on said diaphragm for the purpose of maintaining the longitudinal balance of said diaphragm and wheel to relieve said wheel from end thrust, by the longitudinal movement of the shaft on which said diaphragm and wheel are mounted, substantially as specified.

In testimony whereof I have hereunto set my hand this 2d day of April, A. D. 1900.

FULLER TRUMP.

Witnesses:
CHAS. I. WELCH,
CLIFTON P. GRANT.